(12) United States Patent
Fuller

(10) Patent No.: US 8,997,364 B2
(45) Date of Patent: Apr. 7, 2015

(54) MARKING SAW GUIDE

(71) Applicant: Herbert L. Fuller, Conyers, GA (US)

(72) Inventor: Herbert L. Fuller, Conyers, GA (US)

(73) Assignee: H. L. Fuller Tool Design, LLC, Conyers, GA (US)

( * ) Notice: Subject to any disclaimer, the term of this patent is extended or adjusted under 35 U.S.C. 154(b) by 207 days.

(21) Appl. No.: 13/845,266

(22) Filed: Mar. 18, 2013

(65) Prior Publication Data
US 2013/0291393 A1    Nov. 7, 2013

Related U.S. Application Data

(60) Provisional application No. 61/617,259, filed on Mar. 29, 2012.

(51) Int. Cl.
*G01B 3/56* (2006.01)

(52) U.S. Cl.
CPC . *G01B 3/563* (2013.01); *G01B 3/56* (2013.01)

(58) Field of Classification Search
CPC .................................. G01B 3/563; G01B 3/56
USPC ........... 33/640, 421, 423, 424, 465, 471, 630; 83/821
See application file for complete search history.

(56) References Cited

U.S. PATENT DOCUMENTS

| | | | |
|---|---|---|---|
| 4,531,296 A * | 7/1985 | Veeze | 33/670 |
| 4,608,898 A | 9/1986 | Volk | |
| 4,611,407 A * | 9/1986 | van Gorp | 33/471 |
| 4,624,054 A | 11/1986 | Edwards | |
| 4,901,444 A * | 2/1990 | Maschmeier | 33/423 |
| 4,974,306 A * | 12/1990 | Cole et al. | 29/434 |
| 5,121,553 A * | 6/1992 | Boerder | 33/640 |
| 5,187,877 A * | 2/1993 | Jory et al. | 33/640 |
| D363,239 S | 10/1995 | Spirer et al. | |
| 6,148,531 A * | 11/2000 | Economaki | 33/465 |
| 6,725,555 B1 * | 4/2004 | Moore | 33/423 |
| 6,839,974 B1 * | 1/2005 | Hitchcock | 33/473 |
| 7,228,636 B1 * | 6/2007 | Moore | 33/417 |
| 7,739,806 B1 * | 6/2010 | Pater | 33/417 |
| 2003/0221329 A1* | 12/2003 | Gompper et al. | 33/640 |
| 2006/0174503 A1* | 8/2006 | Johnson | 33/471 |
| 2012/0096725 A1 | 4/2012 | Pinal et al. | |

* cited by examiner

*Primary Examiner* — Christopher Fulton
(74) *Attorney, Agent, or Firm* — Bryan W. Bockhop; Bockhop & Associates, LLC

(57) ABSTRACT

An angle marking saw guide for marking a plank having a front side that includes a planar marking member including a protractor portion extending upwardly from a flat ruled straight edge portion having a straight edge. A planar reference member includes a rectangular portion a triangular portion extending laterally from the rectangular portion. The triangular portion includes a first angled edge and a second angled edge that meets the first angled edge at a vertex. The marking member is pivotally affixed to the reference member with a fastener disposed adjacent to the vertex. A vertical wall portion depends downwardly from the front edge and engages the front side of the plank so as to maintain the reference member in a fixed angular relationship with the front side. A lip surface extends at an angle from the back edge to facilitate lifting of the reference member from the plank.

15 Claims, 2 Drawing Sheets

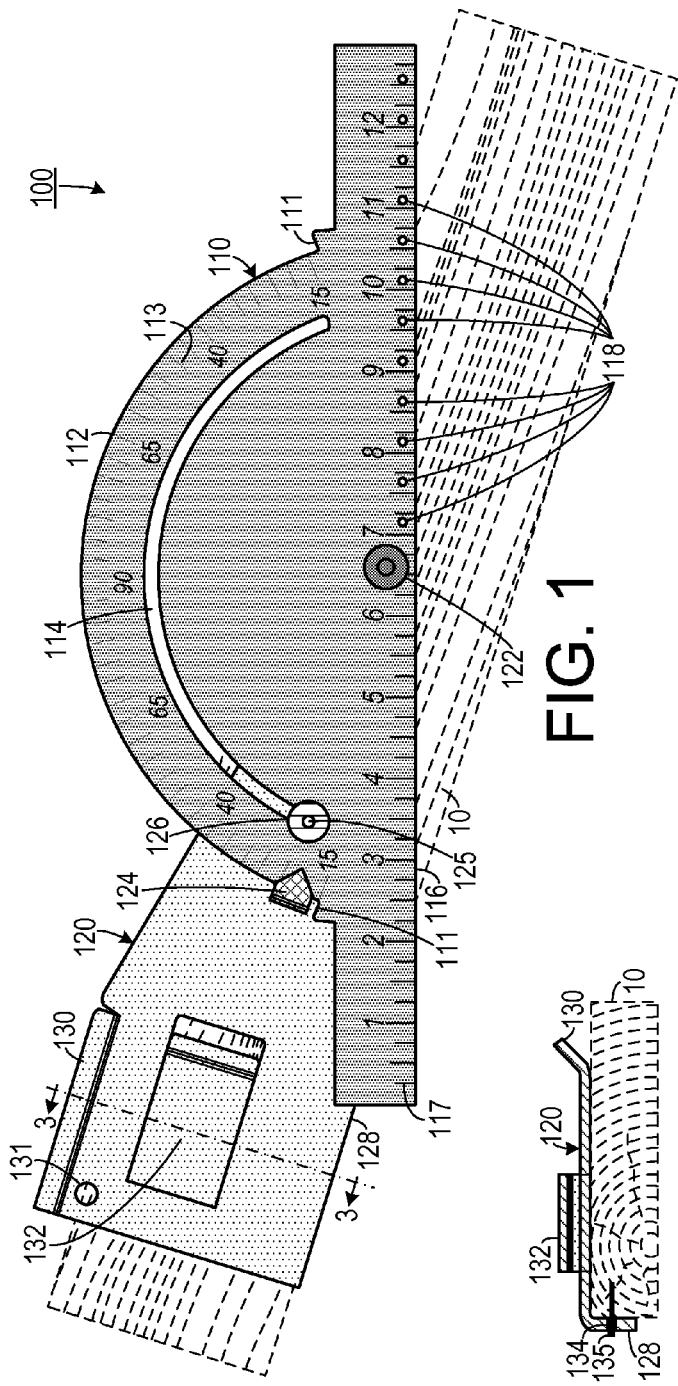
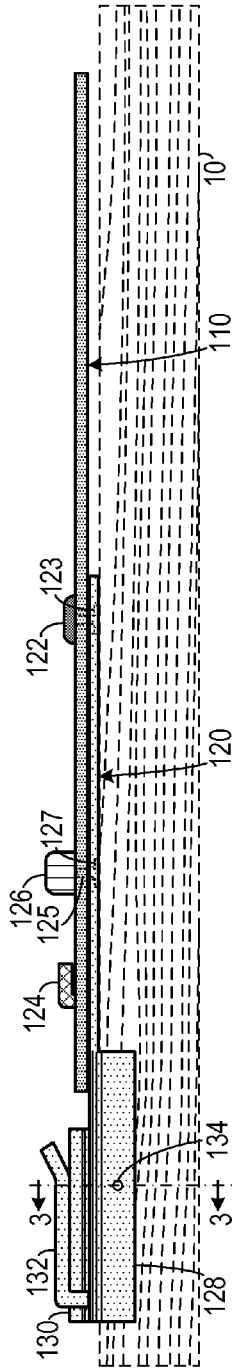
FIG. 1
FIG. 2
FIG. 3

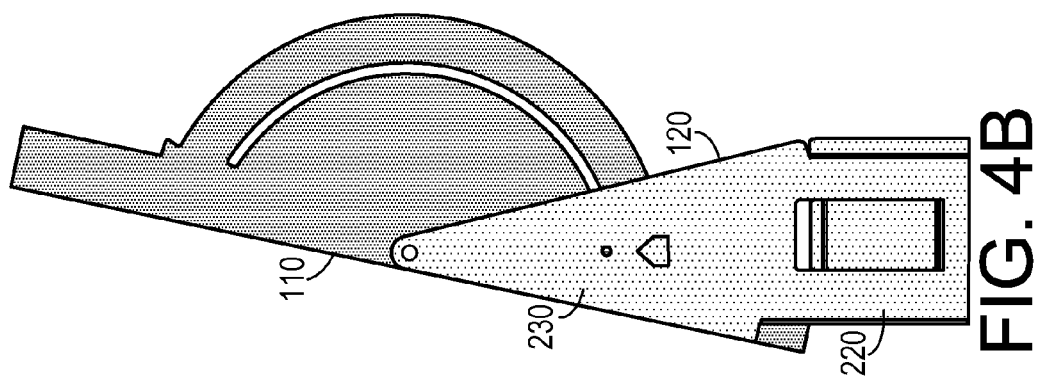
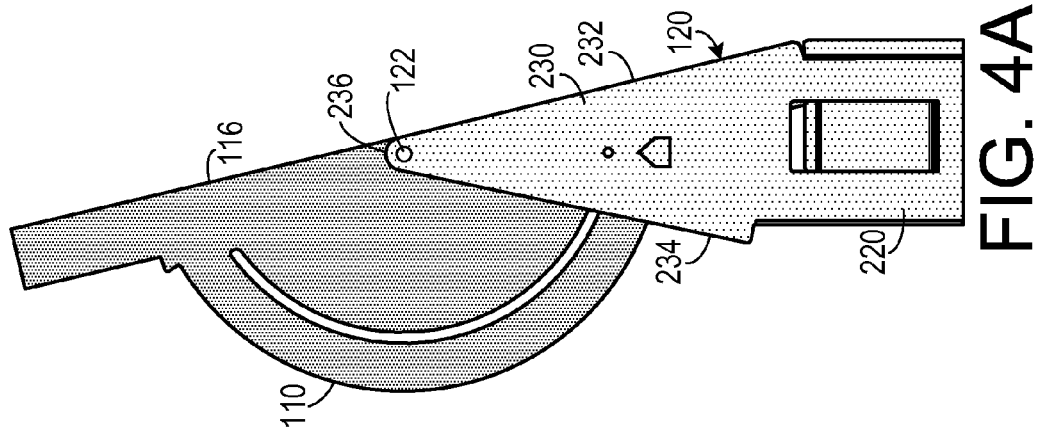

MARKING SAW GUIDE

CROSS-REFERENCE TO RELATED APPLICATION(S)

This application claims the benefit of U.S. Provisional Patent Application Ser. No. 61/617,259, filed Mar. 29, 2012, the entirety of which is hereby incorporated herein by reference.

BACKGROUND OF THE INVENTION

1. Field of the Invention

The present invention relates to carpentry tools and, more specifically, to a tool for marking angled lines on a board.

2. Summary of the Invention

The disadvantages of the prior art are overcome by the present invention which, in one aspect, is an angle marking saw guide for marking a plank having a front side that includes a planar marking member including a protractor portion extending upwardly from a flat ruled straight edge portion having a straight edge. The protractor portion ends in an arcuate edge having a constant radius from a pivot point disposed at a central location of the straight edge portion. A plurality of graduated angle markings is disposed adjacent to the arcuate edge. The protractor portion defines an arcuate slot that is concentric with the arcuate edge passing through the protractor portion. A first detent is defined at a first end of the arcuate edge and a second detent is defined at second end of the arcuate edge. The second end is angularly opposite from the first end. A planar reference member includes a substantially rectangular portion having a front edge and an opposite back edge and a substantially triangular portion extending laterally from the rectangular portion. The triangular portion includes a first angled edge and a transverse second angled edge that meets the first angled edge at a vertex. The marking member is pivotally affixed to the reference member with a fastener disposed adjacent to the vertex. The first angled edge has an angle relative to the front edge so that the triangular portion extends no further than the straight edge when the marking member is rotated fully in a first angular direction and the second angled edge having an angle relative to the back edge so that the triangular portion extends no further than the straight edge when the marking member is rotated fully in a second angular direction opposite from the first angular direction. A vertical wall portion depends downwardly from the front edge and is configured to engage the front side of the plank so as to maintain the reference member in a fixed angular relationship with the front side. A lip surface extends upwardly at an angle between 5° and 85° from the back edge of the reference member and is configured to facilitate lifting of the reference member from the plank. A setting bolt extends upwardly from the reference member through the arcuate slot defined by the protractor portion. A setting nut is engaged with the setting bolt and is configured to apply force to the protractor portion so as to hold the marking member in a fixed angular relationship with the reference member when the setting nut is secured tightly against the protractor portion and configured to allow free angular movement of the protractor portion with respect to the reference member when the setting nut is not secured tightly against the protractor portion. A stopping structure extends upwardly from the reference member so as to limit rotational motion of the marking member in the first angular direction by engaging the first detent and in the second angular direction by engaging the second detent. The stopping structure ends in a pointing member that is configured to point at the graduated angle markings so that when the pointing member points at a selected one of the graduated angle markings, the straight edge has an angle relative to the vertical wall portion that corresponds to the selected one of the graduated angle markings.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a plan view of one embodiment.

FIG. 2 is an elevational view of the embodiment shown in FIG. 1.

FIG. 3 is a cross-sectional view of a portion of the embodiment shown in FIGS. 1 and 2, taken along line 3-3.

FIGS. 4A-4B are bottom plan views of one embodiment.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment is a saw guide 100 for marking planks, such as boards 10 and the like. The saw guide 100 includes a planar marking member 110 that includes a protractor portion 112 and a straight edge portion 116 that extends from the bottom of the protractor portion 112, which can be 13 inches long in the embodiment shown or could be any other length depending upon the specific application. A plurality of graduated markings 117 are printed on the straight edge portion 116 so as to provide an indication of length along the straight edge. The protractor-straight edge planar marking member 110 is pivotally affixed to a reference member 120 by a central fastener 122 (such as a rivet, screw or the like, which has a head 123 that is flush with the bottom surface of the reference member) so that it can pivot relative to the reference member 120 to any angle within its pivoting range (which in the embodiment shown is between 15° and 165° and is shown as between 15° and 90° on each side of 90°). The protractor portion 112 is scored or otherwise marked with evenly spaced apart markings 113 that show the angle of the strait edge portion 116 and the board 10 being marked. A semi-circular slot 114 is defined by the protractor portion 112 and is concentric therewith. A setting bolt 125 extends upwardly from the reference member 120 through the slot 114 and is engaged by a nut 126 that can be tightened to hold the protractor-straight edge member 110 in place relative to the reference member 120. The setting bolt 125 has a head 127 that is flush with the bottom surface of the reference member 120. A pointer 124, affixed to the reference member 120, points to the markings 113 on the protractor portion 112 to indicate the angle being marked. The pointer 124 is also configured as a vertical stopping structure that engages a pair of detents 111 to limit the rotational range of the protractor portion 112. A plurality of evenly spaced holes 118 (e.g., spaced ¼ inch apart) pass through the straight edge portion 116 and can be used to draw semicircles by placing the point of a marking tool (e.g., a pencil or a scratch awl) though the hole, loosening the nut 126 and rotating the protractor-straight edge member 110.

The reference member 120 includes a bent down lip 128 that is configured to be placed against the board 10 so as to hold the reference member 120 in a steady angular relationship therewith. The lip 128 can define a small hole 134 passing therethrough so that the user can drive a tack or other type of nail 135 through the hole 134 into the board 10 to hold the reference member 120 more securely against the board 10. A turned up lip 130 can be bent into the reference member 120 (for example, at an angle of between 5° and 85°) to facilitate easy lifting of the guide 100 from the board 10. A belt clip 132 can be stamped out of the reference member 120 (or attached thereto) to allow the user to wear the saw guide 100 at the work site on a tool belt. The reference member 120 can also define a hole 131 passing therethrough to facilitate hanging the saw guide 100 on a hook when not in use.

In one embodiment, the saw guide 100 is made from a metal such as stainless steel or aluminum. In another embodiment, it can be made from other materials, including plastics, composites and one of many other suitable materials known to the art.

In use, the user loosens the nut 126, adjusts the protractor-straight edge member 110 until the pointer 124 points to the desired angle shown on the markings 113 and then re-tightens the nut 126, thereby holding the planar marking member 110 securely at the desired angle. The user places the saw guide 100 against the board 10 with the turned down lip 128 placed against the flat surface of the board 10 and marks the board 10 along the straight edge portion 116. The user can also mark the board 10, move the saw guide 100 slightly away from the mark and then use the saw guide 100 to guide a saw as it cuts the board 10, thereby ensuring a straight cut at the desired angle.

In one embodiment, as shown in FIGS. 4A-4B, the reference member 120 includes a rectangular portion 220 and a triangular portion 230 extending from the rectangular portion 220. The triangular portion 230 has a first angled edge 232 and a transverse second angled edge 234 that meets the first angled edge 232 at a vertex 236. The marking member 110 is pivotally affixed to the reference member 120 with the fastener 122 disposed adjacent to the vertex 236. The first angled edge 232 has an angle relative to the front edge so that the triangular portion 230 extends no further than the straight edge 116 when the marking member 110 is rotated fully in a first angular direction (as shown in FIG. 4A). Similarly, the second angled edge 234 has an angle relative to the back edge so that the triangular portion 230 extends no further than the straight edge 116 when the marking member is rotated fully in a second angular direction opposite from the first angular direction (as shown in FIG. 4B).

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An angle marking saw guide for marking a plank having a front side, comprising:
   (a) a planar marking member including a protractor portion extending upwardly from a flat ruled straight edge portion having a straight edge, the protractor portion ending in an arcuate edge having a constant radius from a pivot point disposed at a central location of the straight edge portion, a plurality of graduated angle markings disposed adjacent to the arcuate edge, the protractor portion defining an arcuate slot that is concentric with the arcuate edge passing through the protractor portion, a first detent defined at a first end of the arcuate edge and a second detent defined at second end of the arcuate edge, the second end angularly opposite from the first end;
   (b) a planar reference member including a substantially rectangular portion having a front edge and an opposite back edge and a substantially triangular portion extending laterally from the rectangular portion, the triangular portion including a first angled edge and a transverse second angled edge that meets the first angled edge at a vertex, the marking member pivotally affixed to the reference member with a fastener disposed adjacent to the vertex, the first angled edge having an angle relative to the front edge so that the triangular portion extends no further than the straight edge when the marking member is rotated fully in a first angular direction and the second angled edge having an angle relative to the back edge so that the triangular portion extends no further than the straight edge when the marking member is rotated fully in a second angular direction opposite from the first angular direction;
   (c) a vertical wall portion depending downwardly from the front edge of the planar reference member and configured to engage the front side of the plank so as to maintain the reference member in a fixed angular relationship with the front side;
   (d) a lip surface extending upwardly at an angle between 5° and 85° from the back edge of the reference member and configured to facilitate lifting of the reference member from the plank;
   (e) a setting bolt extending upwardly from the reference member through the arcuate slot defined by the protractor portion;
   (f) a setting nut engaged with the setting bolt and configured to apply force to the protractor portion so as to hold the marking member in a fixed angular relationship with the reference member when the setting nut is secured tightly against the protractor portion and configured to allow free angular movement of the protractor portion with respect to the reference member when the setting nut is not secured tightly against the protractor portion;
   (g) a stopping structure extending upwardly from the reference member so as to limit rotational motion of the marking member in the first angular direction by engaging the first detent and in the second angular direction by engaging the second detent, the stopping structure ending in a pointing member that is configured to point at the graduated angle markings so that when the pointing member points at a selected one of the graduated angle markings, the straight edge has an angle relative to the vertical wall portion that corresponds to the selected one of the graduated angle markings; and
   (h) a clip affixed to the reference member and configured facilitate the holding of the angle marking saw guide on a tool belt.

2. The angle marking saw guide of claim 1, wherein the vertical wall portion defines a nail hole passing therethrough.

3. The angle marking saw guide of claim 2, further comprising a nail driven through the nail hole into the plank so as to hold the marking member in a fixed relationship with the plank.

4. The angle marking saw guide of claim 1, wherein the clip comprises a rectangular area that has been punched from the reference member on three sides and bent upwardly away from the reference member.

5. The angle marking saw guide of claim 1, wherein the flat ruled straight edge portion includes markings adjacent to the straight edge that provide an indication of length along the straight edge.

6. The angle marking saw guide of claim 1, wherein the marking member and the reference member are each made of a material selected from a group of materials consisting of: sheet aluminum, sheet steel, sheet plastic, and combinations thereof.

7. The angle marking saw guide of claim 1, wherein the flat ruled straight edge portion defines a plurality of spaced apart holes passing therethrough and configured to receive a marking point therethrough to facilitate the marking of curved lines on the plank.

8. The angle marking saw guide of claim 1, wherein the lip surface comprises an area in which the back edge of the reference member has been bent upwardly.

9. The angle marking saw guide of claim 1, wherein the fastener comprises a rivet having a head that is flush with a bottom surface of the reference member.

10. The angle marking saw guide of claim 1, wherein the setting bolt has a head that is flush with a bottom surface of the reference member.

11. A marking guide for marking a plank having a front side, comprising:
  (a) a planar marking member including a protractor portion extending upwardly from a flat ruled straight edge portion having a straight edge, a plurality of spaced apart ruled markings adjacent the straight edge that provide an indication of length along the straight edge, the protractor portion ending in an arcuate edge having a constant radius from a pivot point disposed at a central location of the straight edge portion, a plurality of graduated angle markings disposed adjacent to the arcuate edge, the protractor portion defining an arcuate slot that is concentric with the arcuate edge passing through the protractor portion, a first detent defined at a first end of the arcuate edge and a second detent defined at second end of the arcuate edge, the second end angularly opposite from the first end;
  (b) a planar reference member including a substantially rectangular portion having a front edge and an opposite back edge and a substantially triangular portion extending laterally from the rectangular portion, the triangular portion including a first angled edge and a transverse second angled edge that meets the first angled edge at a vertex, the marking member pivotally affixed to the reference member with a fastener disposed adjacent to the vertex, the first angled edge having an angle relative to the front edge so that the triangular portion extends no further than the straight edge when the marking member is rotated fully in a first angular direction and the second angled edge having an angle relative to the back edge so that the triangular portion extends no further than the straight edge when the marking member is rotated fully in a second angular direction opposite from the first angular direction;
  (c) a vertical wall portion depending downwardly from the front edge of the planar reference member and configured to engage the front side of the plank so as to maintain the reference member in a fixed angular relationship with the front side, the vertical wall portion defining a nail hole passing therethrough;
  (d) a lip surface bent upwardly from the back edge of the reference member and configured to facilitate lifting of the reference member from the plank;
  (e) a setting bolt extending upwardly from the reference member through the arcuate slot defined by the protractor portion;
  (f) a setting nut engaged with the setting bolt and configured to apply force to the protractor portion so as to hold the marking member in a fixed angular relationship with the reference member when the setting nut is secured tightly against the protractor portion and configured to allow free angular movement of the protractor portion with respect to the reference member when the setting nut is not secured tightly against the protractor portion;
  (g) a stopping structure extending upwardly from the reference member so as to limit rotational motion of the marking member in the first angular direction by engaging the first detent and in the second angular direction by engaging the second detent, the stopping structure ending in a pointing member that is configured to point at the graduated angle markings so that when the pointing member points at a selected one of the graduated angle markings, the straight edge has an angle relative to the vertical wall portion that corresponds to the selected one of the graduated angle markings;
  (h) a nail driven through the nail hole into the plank so as to hold the reference member in a fixed relationship with the plank; and
  (i) a clip affixed to the reference member and configured facilitate the holding of the angle marking saw guide on a tool belt.

12. The marking guide of claim 11, wherein the marking member and the reference member are each made of a material selected from a group of materials consisting of: sheet aluminum, sheet steel, sheet plastic, and combinations thereof.

13. The marking guide of claim 11, wherein the flat ruled straight edge portion defines a plurality of spaced apart holes passing therethrough and configured to receive a marking point therethrough to facilitate the marking of curved lines on the plank.

14. The marking guide of claim 11, wherein the fastener comprises a rivet having a head that is flush with a bottom surface of the reference member.

15. The marking guide of claim 11, wherein the setting bolt has a head that is flush with a bottom surface of the reference member.

* * * * *